United States Patent
Ye et al.

(10) Patent No.: US 10,937,053 B1
(45) Date of Patent: Mar. 2, 2021

(54) FRAMEWORK FOR EVALUATING TARGETING MODELS

(71) Applicant: Facebook, Inc., Menlo Park, CA (US)

(72) Inventors: Xingyao Ye, Mountain View, CA (US); David Townsend Martin, San Francisco, CA (US); Michael Phillip Salem, Mountain View, CA (US); Yi Wu, Sunnyvale, CA (US); Jie Xiong, Mountain View, CA (US); Mark Teng Xia, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 197 days.

(21) Appl. No.: 16/158,309

(22) Filed: Oct. 12, 2018

Related U.S. Application Data

(63) Continuation of application No. 14/940,794, filed on Nov. 13, 2015, now Pat. No. 10,127,573.

(51) Int. Cl.
*G06Q 30/00* (2012.01)
*G06Q 30/02* (2012.01)

(52) U.S. Cl.
CPC ..... *G06Q 30/0243* (2013.01); *G06Q 30/0245* (2013.01); *G06Q 30/0255* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 2012/0151533 A1 | 6/2012 | Kandanala et al. | |
| 2015/0032507 A1* | 1/2015 | Narasimhan | G06Q 30/0254 705/7.31 |
| 2015/0100415 A1* | 4/2015 | Yu | G06Q 30/0251 705/14.49 |
| 2017/0236160 A1* | 8/2017 | Oberoi | G06Q 30/0269 705/14.66 |

OTHER PUBLICATIONS

United States Office Action, U.S. Appl. No. 14/940,794, dated Nov. 13, 2015, 16 pages.

* cited by examiner

*Primary Examiner* — Alvin L Brown
(74) *Attorney, Agent, or Firm* — Fenwick & West LLP

(57) ABSTRACT

An online system predicts, using a first targeting model, a first group of users as candidates to be in a targeting cluster, and predicts, using a second targeting model, a second group of users as candidates to be in the targeting cluster. The online system determines a first set of users that are not part of the first group of users, and a second set of users that are not part of the second group of users, and provides surveys to the first and second set of users. The online system determines a first subgroup of the first group of users and a second subgroup of the second group of users, and provides an ad preferences tool to the first subgroup and the second subgroup. The online system scores the first and second targeting models based in part on responses to the surveys and/or the ad preferences tools.

17 Claims, 2 Drawing Sheets

US 10,937,053 B1

FRAMEWORK FOR EVALUATING TARGETING MODELS

CROSS REFERENCE TO RELATED APPLICATIONS

This application is a continuation of co-pending U.S. application Ser. No. 14/940,794, filed Nov. 13, 2015, which is incorporated by reference in its entirety.

BACKGROUND

This disclosure relates generally to advertising systems, and in particular to benchmarks for evaluating different advertisement targeting models that associate users of an online system with targeting attributes or a targeting cluster.

Advertising systems may select advertisements for presentation to users. The advertising systems select advertisements using models that are used to match advertisements to specific users. However, conventional advertising systems lack compressive benchmarks and/or tools for evaluating the models.

SUMMARY

An online system provides a set of tools that are used to evaluate different targeting models. A targeting model is a collection of rules that control how characteristics (e.g., gender, interests, location, occupation, etc.) are associated with users of the online system. Targeted advertisements may then be directed to the users based in part on the characteristics associated with the users. The tools or evaluation framework provided by the online system acts generally as a universal benchmark providing a universal metric for evaluating a variety of different mechanisms for performing targeting. The tools can be used internally by the online system for evaluating its own targeting models and/or can be provided to advertisers as feedback on different targeting models.

The online system retrieves a first targeting model and a second targeting model. The first targeting model and the second targeting model include collections of rules that control how characteristics are mapped to users of the online system. The online system predicts using the first targeting model a first group of users of the online system as candidates to be in a targeting cluster associated with a characteristic of interest. Similarly, the online system predicts a second group of users of the online system as candidates to be in the targeting cluster. As the first and second targeting models are different, it is likely that the first and second group of users are different from each other.

The online system determines a first set of users of the online system that are not part of the first group of users, and a second set of users of the online system that are not part of the second group of users. The online system provides surveys to the first set of users and the second set of users. A survey asks whether the user receiving the survey should be associated with the characteristic of interest. The survey tests whether the targeting model used to determine a set including the user correctly predicted that the user should not be included in the targeting cluster associated with the characteristic of interest.

The online system determines a first subgroup of the first group of users and a second subgroup of the second group of users. The first subgroup and second subgroup are composed of users that are associated with the characteristic of interest. The online system provides an ad preferences tool to the first subgroup and the second subgroup. The ad preferences tool prompts a viewing user to modify ad preferences listed for the viewing user. The ad preferences tool tests whether the targeting model used to determine a subgroup of the viewing user correctly predicted that the viewing user should be included in the targeting cluster associated with the characteristic of interest.

The online system scores the first targeting model and the second targeting model based at least in part on one or more responses to the surveys and/or one or more responses to the ad preferences tool, the score measuring precision and recall of the first and second targeting models.

Additionally, in some embodiments, the online system conducts A/B testing to compare a targeting model to an active targeting model. A/B testing is a comparison of two targeting models to determine which model performs better. Performance may be measured using different metrics (e.g., ad score, click thru rate, number of conversions, etc.). An active targeting model is a targeting model that is actively being used by an advertising system (e.g., the online system or a third party system) to identify users for targeted advertisements. The online system may, e.g., select the first targeting model or the second targeting model based on their associated scores for A/B testing. In some embodiments, a user of the online system may select the targeting model (e.g., the first targeting model, the second targeting model, or some other targeting model) and/or the active targeting model for A/B testing via, e.g., a model evaluation interface.

The figures depict various embodiments for purposes of illustration only. One skilled in the art will readily recognize from the following discussion that alternative embodiments of the structures and methods illustrated herein may be employed without departing from the principles of described herein.

DETAILED DESCRIPTION

System Architecture

Figure 1:
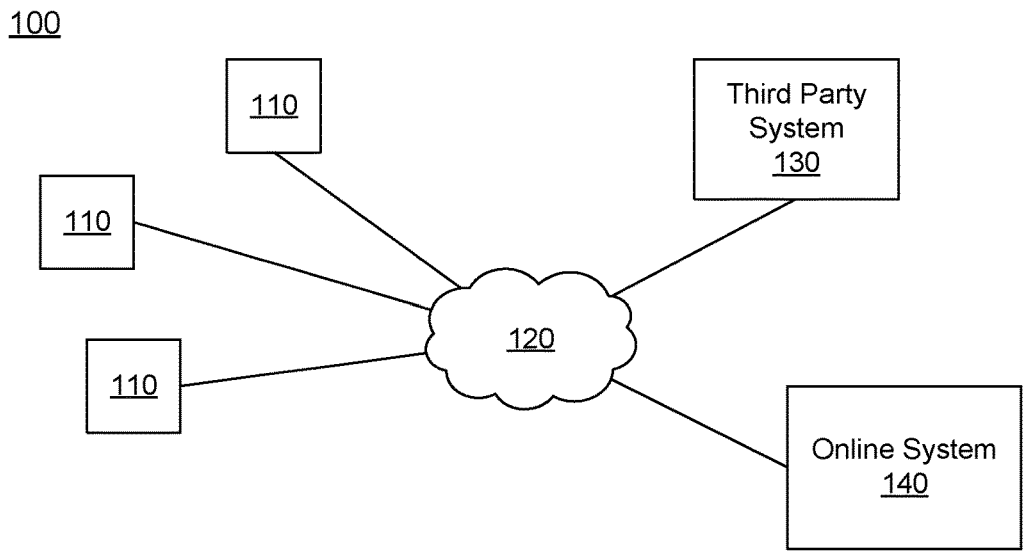
FIG. 1 is a block diagram of a system environment in which a social networking system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
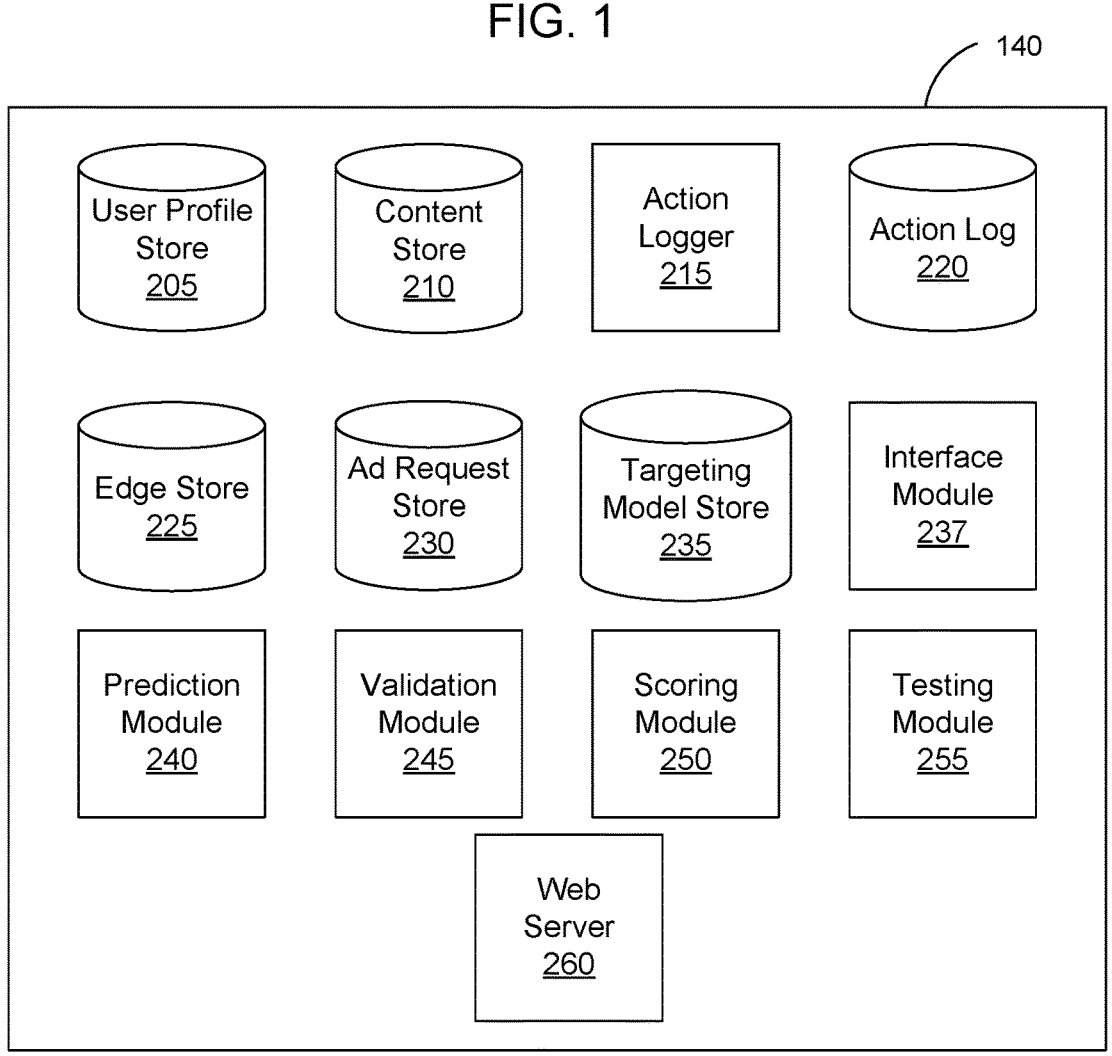
FIG. 2 is a block diagram of an online system, in accordance with an embodiment.

FIG. 2 is an example block diagram of an architecture of an online system 140. The online system 140 shown in FIG. 2 includes a user profile store 205, a content store 210, an action logger 215, an action log 220, an edge store 225, an ad request store 230, a targeting model store 235, interface module 237, prediction module 240, validation module 245, scoring module 250, testing module 255, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the social networking system XX40 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content, also referred to as an "advertisement," and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an ad request by an advertiser and is used to determine an expected value, such as monetary compensation, provided by an advertiser to the online system 140 if advertisement content in the ad request is presented to a user, if the advertisement content in the ad request receives a user interaction when presented, or if any suitable condition is satisfied when advertisement content in the ad request is presented to a user. For example, the bid amount specifies a monetary amount that the online system 140 receives from the advertiser if the advertisement in an ad request is displayed. In some embodiments, the expected value to the online system 140 of presenting the advertisement in an ad request may be determined by multiplying the bid amount by a probability of the advertisement being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 230. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

The targeting model store 235 stores different targeting models. A targeting model is a collection of rules that control how characteristics (e.g., gender, interests, location, occupation, etc.) are associated with users of the online system 140. Targeted advertisements may then be directed to the users based in part on the characteristics associated with the users. A targeting cluster is an ideal set of users that are associated with one or more characteristics, and the ideal set of users make up some or all of the users of the online system 140. Given one or more characteristics, a targeting model may be used to predict a set of users of the online system 140 that could be in the targeting cluster for the given one or more characteristics.

The interface module 237 generates a model evaluation interface. The model evaluation interface is an interface that enables a user to select a plurality of different targeting models for evaluation. The model evaluation interface may be, e.g., a graphical user interface or a text based interface. Additionally, in some embodiments, the model evaluation interface allows a user to edit the rules that make up a targeting model. The interface module 237 provides the model evaluation interface to a user of the online system 140 via a client device 110 and/or the third party system 130. Responsive to input received (e.g., a user selecting targeting model A and targeting model B and one or more characteristics of interest) from the model evaluation interface, the interface module 237 selects one or more targeting models for evaluation. A characteristic of interest is a characteristic used to evaluate a targeting model. One or more characteristics of interest may be used to evaluate a targeting model. The characteristic of interest may be any characteristic of a user, e.g., an interest in photography, parenthood, user's occupation, etc. In some embodiments, one or more characteristics of interest are provided by the user via, e.g., the model evaluation interface. In alternate embodiments, the one or more characteristics of interest are provided by the online system 140. Additionally, in some embodiments, the model evaluation interface may perform one or more functions as described below with regard to the scoring module 250 and/or the testing module 255.

The prediction module 240 predicts a group of users for each of the one or more targeting models being evaluated for one or more characteristics of interest. For a given targeting model, the prediction module 240 predicts a group of users by applying the rules in a targeting model to identify one or more users of the online system 140 that are associated with one or more characteristics of interest. One or more of the rules differ for different targeting models, accordingly, different targeting models may predict different groups of users for a same characteristic of interest such that one of targeting models predicts a group of users that is more similar to the ideal set of users of the targeting cluster for the characteristic of interest.

The rules describe how the online system 140 uses information to determine characteristics of the users of the online system 140. Information used to determine characteristics may be, e.g., expressly provided from a user (e.g., directly to the online system 140 or indirectly from a connection of the user and/or a third party system 130), inferred from information provided by the users, inferred from actions or types of connections between a user and another user or object of the online system 140, inferred from interactions between a user and objects performed external to the online system 140 (such as on a third party system 130), or some combination thereof. A rule uses the information to attribute one or more characteristics to a user. For example, a rule may be, e.g., to infer that a user's income is above a threshold value if they live in a particular zip code, to infer that a user has kids if he/she is over a threshold age (e.g., 25) and purchases diapers, etc.

Some characteristics may be made express by a user (e.g., a user posting an interest). However, it is important to note that information expressly provided by the user may not always be true (e.g., user mistake or user is deliberately providing false information). Similarly, rules that infer characteristic may also not correctly map inferred characteristics to users of the online system 140. For example, continuing with the above example a 30 year old user who bought diapers might not have kids, but was simply purchasing the diapers for someone else. Accordingly, the example rule discussed above would incorrectly associate the user to a characteristic of being a parent. However, if the rule included other conditions (e.g., express posting about having a child) it would result in a more accurate assessment of whether the user is a parent or not.

The validation module 245 validates predicted groups of users for the one or more targeting models being evaluated. Validation is a confirmation that some, or all, of the predicted groups of users should be associated with the one or more given characteristics. Validation includes testing whether the targeting models are accurately identifying users as being associated with a characteristic of interest. Additionally, validation includes testing whether users not included in a predicted group of users were correctly excluded from the group of users for the characteristic of interest.

The validation module 245 identifies one or more users that are not in a predicted group of users. In other words, the validation module 245 identifies one or more users that are not directly associated with the one or more characteristics used by the targeting model to generate the predicted group of users. The validation module 245 may randomly select a threshold number of users who are not in a predicted group of users. The threshold number may correspond to a percentage of the total number of users in the predicted group of users, any number less than or equal to the total number of users of the online system 140, etc. In cases where there are two or more predicted groups of users being evaluated, the validation module 245 identifies, for each of the targeting models, at least one user of the online system 140 who is not part of the respective predicted group of users.

The validation module 245 generates and provides surveys to the identified users. The surveys include questions designed to validate whether the users should be associated with the characteristic of interest. And in particular, the surveys test whether a targeting model correctly predicted that a user receiving the survey should not be included in the targeting cluster associated with the one or more characteristics of interest. For example, if the characteristic of interest is having kids, possible survey questions may be, e.g., "are you a parent?," "do you have kids?," etc. The validation module 245 generates the questions based on the one or more characteristics of interest. The validation module 245 provides the surveys to the client devices 110 associated with the identified users. In some embodiments, the surveys are short (e.g., one question) yes/no type questions that are designed to have minimal impact on the user's time. The surveys confirm whether or not a targeting model, for the one or more characteristics of interest, is correctly associating users with the one or more characteristics of interest who are not directly associated with the one or more characteristics of interest.

The validation module 245 also selects users from a predicted group of users (i.e., are directly associated with the one or more characteristics of interest). The validation module 245 may randomly selects a threshold number (e.g., 10%) of users from the predicted set of users. And in some embodiments, the validation module 245 selects all of the predicted set of users. In cases where there are two or more groups of users being compared, the validation module 245 identifies at least one user from each of the sets of users. In alternate embodiments, the validation module 245 identifies at least a threshold number of users in each of predicted set of users, the threshold number being a percentage (e.g., 10%) of the total number of users in each respective predicted set of users.

The validation module 245 generates an ad preferences tool. The ad preferences tool is a graphical user interface that prompts a viewing user to confirm their characteristics. And in particular, the ad preferences tool tests whether a targeting model correctly predicted that a user receiving the ad preferences tool should be included in the targeting cluster associated with the one or more characteristics of interest. In addition to the one or more characteristics of interest, the ad preferences tool may prompt the viewing user to confirm and/or provide other characteristics about themselves. Additionally, in some embodiments, the ad preferences tool prompts the viewing user for information relating to types of advertisements they are interested in being presented. The validation module 245 generates an ad preferences tool for each of the selected users using in part the one or more characteristics. The validation module 245 provides the generated ad preferences tools to the client devices 110 corresponding to the selected users.

The scoring module 250 receives feedback from the identified users and the selected users via their corresponding client devices 110. The feedback may be, e.g., a response to a survey and/or a response to the ad preferences tool. Responses to the surveys are used to estimate a number of false negatives and a number of true negatives. A true negative occurs if a response to a survey affirms that the responding user is not associated with one or more characteristics of interest associated with the targeting model being tested. A false negative occurs if a response to a survey indicates that the responding user is associated with the one or more characteristics of interest.

In contrast, responses to the ad preferences tool ad used to estimate a number of true positives and a number of false positives. A true positive occurs if a response to the ad preferences tool affirms that a user is associated with the one or more characteristics of interest that the targeting model used to place him/her in a corresponding predicted set of users. A false positive occurs if a response from the ad preferences tool indicates that a selected user is not associated with the one or more characteristics of interest.

The scoring module 250 scores the targeting models being evaluated using the received feedback. The scoring module 250 scores each targeting model based on the number of true negatives, false negatives, true positives, and false positives that occur. For a given targeting model, a large number of true negatives relative to false negatives indicates that the targeting model is correctly excluding users from the predicted group of users who the targeting model indicates are associated with the one or more characteristics of interest. Similarly, for the given targeting model, a large number of true positives relative to false positives indicates that the targeting model is correctly including users in the predicted group of users that are associated with the one or more characteristics of interest.

In some embodiments, the scoring module 250 determines, for each targeting model being evaluated, a ratio of a total number of true negatives to a total number of false negatives (also referred to as an "excluding ratio") and a ratio of a total number of true positives to a total number of false positives (also referred to as an "including ratio"). Thus, the larger the ratio values, the better a targeting model is doing in predicting a group of users who match an ideal group of users for a targeting cluster. In some embodiments, the scoring module 250 may weight, e.g., the total number of true positives, the total number of false positives, the total number of true negatives, the total number of false negatives, or some combination thereof. For example, weighting might occur to account for users that do not respond to a survey or ad preferences tool.

Additionally, the scoring module 250 may determine a precision score and/or a recall score for each of the compared targeting models. A precision score is a measure of a fraction of retrieved instances that are relevant. The precision score may be determined by, for example:

$$\text{Precision Score} = \frac{TP}{TP + TN} \quad (1)$$

Where TP is a true positive and TN is a true negative. A recall score is a measure of the fraction of relevant instances that are retrieved. The recall score may be determined by, for example:

$$\text{Recall Score} = \frac{TP}{TP + FN} \quad (2)$$

Where FN is a false negative. Additionally, while equations (1) and (2) are expressed as ratios, in some embodiments, they may expressed as probabilities.

The scoring module 250 generates a model score for a model using, e.g., the excluding ratio, including ratio, one or more of the true positives, one or more of the true negatives, one or more of the false positives, one or more of the false negatives, or some combination thereof. The model score is a score that indicates an overall performance of a targeting model. In some embodiments, the model score is calculated by adding the excluding ratio and including ratio. In some embodiments, one or both of the excluding ratio and including ratio are weighted prior to calculating the model score.

The scoring module 250 presents one or more scores to the user via the model evaluation interface. The one or more scores may include, e.g., the model score, the precision score, the recall score, some other score associated with the performance of a targeting model. Additionally, in some embodiments, where a plurality of targeting models are being evaluated for one or more characteristics of interest, the scoring module 250 ranks each of the plurality of targeting models by their respective model score. The scoring module 250 then selects the targeting model with the highest rank (e.g., highest model score) as the best performing targeting model—or in other words the targeting model whose predicted set of users is the closest to the ideal set of users of the targeting cluster associated with the one or more characteristics of interest. The scoring module 250 may present the ranking to the user of the online system 140.

The testing module 255 conducts A/B testing of the selected targeting model with an active targeting model. A/B testing is the comparison of two targeting models to determine which model preforms better. An active targeting model is a targeting model that is actively being used by an advertising system (e.g., the online system 140 or a third party system 130) to identify users for targeted advertisements.

In some embodiments, a user of the online system 140 may instruct the testing module 255 to conduct A/B testing of the selected targeting model with the active targeting model. The user may provide instructions regarding A/B testing using the model evaluation interface. In alternate embodiments, some other user interface may be used to provide instructions regarding the A/B testing. The instructions may, for example, identify a targeting model to test, identify an active targeting model to test, identify one or more characteristics of interest, modify one or more rules of a targeting model, instruct the online system 140 to perform some A/B testing related action, or some combination thereof. In other embodiments, the online system 140 may automatically conduct A/B testing of the selected targeting model with the active targeting model. Similarly, the test module 255 may automatically conduct A/B testing using the one or more characteristics that the selected targeting model was previously evaluated against. Moreover, the A/B testing may include testing the target model against the active model for a plurality of different characteristics of interest (e.g., photography, occupation, etc.).

The testing module 255 predicts a group of users for the selected targeting model and the active targeting model, respectively, for each of the one or more characteristics being tested. The testing module 255 predicts the sets of users in substantially the same way described above with regard to the prediction module 240.

The testing module 255 selects one or more advertisements based on the one or more characteristics of interest and targeting criteria associated with different advertisements. For example, if the characteristic of interest is photography, the testing module 255 may select an advertisement having the same targeting criteria (e.g., an advertisement for a camera) from the ad request store 230. The testing module 255 then provides the selected advertisement to the predicted set of users associated with the selected target group and the predicted set of users associated with the active targeting group.

The testing module 255 determines a metric to evaluate the performance of the selected targeting model and the active targeting model. The metric may be, e.g., an ad score, a validation metric, an engagement metric, some other metric that evaluates the performance of a targeting model, or some combination thereof. The testing module 255 selects the metric based in part on targeting criteria associated with the advertisement provided to the users.

In some embodiments, prior to selecting the advertisement, the testing module 255 partitions users of the online system 140 into a holdout group and a test group. A holdout group is a baseline set of users that are not presented with the advertisement, and test group is a set of users to which the advertisement is provided for presentation. The members of the holdout group and/or the test group may be selected by selecting users such that a random distribution of characteristics occurs. In some cases the characteristics may be chosen for which a random distribution is desired. For example, users may be selected such that characteristics like county, age, and gender are randomized. The testing module 255 may select the members of the holdout group and test group from a predicted set of users associated with the selected targeting model and/or the active targeting model.

Additionally, in some embodiments, the testing module 255 masks a characteristic (e.g., geographic location) or multiple characteristics of the remaining users of the predicted set of users, and places them in a testing group. A masked characteristic is not used by the online system 140 in selecting an advertisement, so only other attributes can be used in targeting. Generally the holdout group is larger than the test group (e.g., 99% of the predicted set of users in the holdout group and the remaining 1% in the test group). The testing module 255 does not take into account the masked characteristic when matching targeting criteria of advertisements to the characteristics of the user. Accordingly, the selected advertisement may be different for members of the holdout group versus members of the testing group since one group is missing certain characteristics that would normally be used in targeting the ads to that group. This allows for testing of incremental targetability of different targeting models. The testing module 255 provides a selected advertisement to the members of the holdout group and an advertisement selected for the test group to the members of the test group.

The testing module 255 determines a value of the masked characteristic using one or more metrics. A metric may be, e.g., click thru rate, number of conversions, revenue generated, some other measure of advertisement performance, or some combination thereof. The testing module 255 may, e.g., determine an amount of revenue generated by the advertisement provided to the holdout group and a second amount of revenue generate by the advertisement that was provided to the test group. The testing module 255 may weight the determined metrics to account for the different population sizes of the holdout group and its corresponding test group. The testing module 255 then compares the metrics (or weighted metrics) for the holdout group and the test group to determine a value of the blocked characteristic. For example, a blocked characteristic may result in a 10% drop in revenue relative to a case where that characteristic is present. The testing module 255 may conduct evaluations for some or all of the characteristics of a predicted set of users to determine which characteristics are the most valuable to an advertiser.

The web server 260 links the online system 140 via the network 120 to the one or more client devices 110, as well as to the one or more third party systems 130. The web server 260 serves web pages, as well as other content, such as JAVA®, FLASH®, XML and so forth. The web server 260 may receive and route messages between the online system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that is stored in the content store 210. Additionally, the web server 260 may provide application programming interface (API) functionality to send data directly to native client device operating systems, such as IOS®, ANDROID™, WEBOS® or BlackberryOS.

Evaluating Advertising Targeting Models

Figure 3:
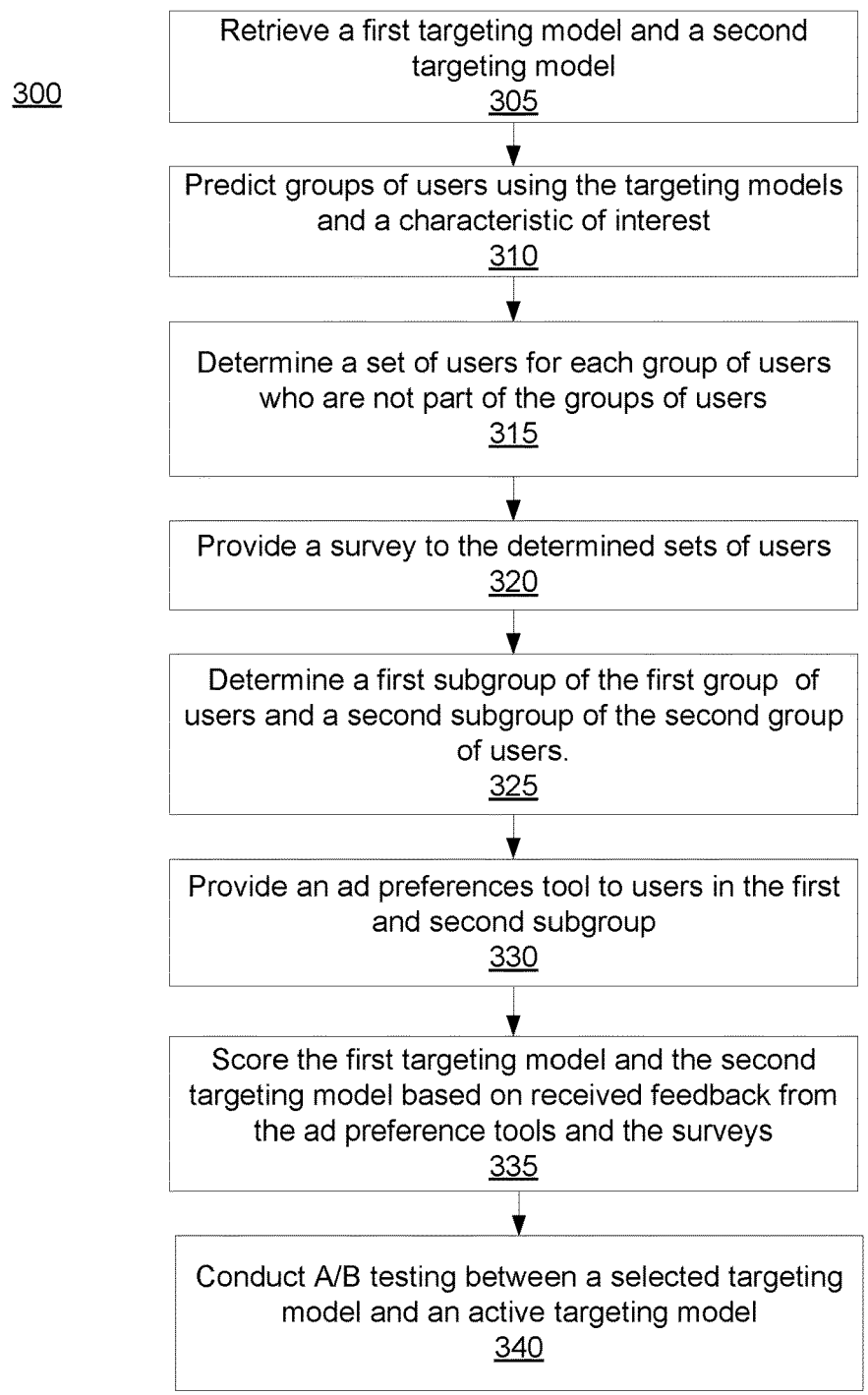
FIG. 3 is a flowchart of a method for evaluating targeting models used by an online system for advertisement targeting, in accordance with an embodiment.

FIG. 3 is a flowchart of one embodiment of a method 300 for evaluating targeting models used by an online system 140 for advertisement targeting. In one embodiment, the process of FIG. 3 is performed by the online system 140. Other entities may perform some or all of the steps of the process in other embodiments. Likewise, embodiments may include different and/or additional steps, or perform the steps in different orders.

The online system 140 retrieves 305 a first targeting model and a second targeting model. In some embodiments, the online system 140 retrieves the first and/or second targeting models from a targeting model store (e.g., targeting model store 235). Alternatively, the online system 140 retrieves the first and/or second targeting models from a third party (e.g., third party system 130). The first targeting model and the second targeting model define different ways targeting attributes are selected for users of the online system 140.

The online system 140 predicts 310 groups of users that are part of a targeting cluster associated with a characteristic of interest using the targeting models. In some embodiments, the characteristic of interest is selected by the online system 140. Alternatively, a user of the online system 140 may select the characteristic of interest via, e.g., a model evaluation interface. Additionally, while in this embodiment, a single characteristic of interest is used. In other embodiments, a plurality of characteristics of interest may be used. As discussed above with regard to FIG. 2, the online system 140 predicts a group of users by applying one or more rules associated with a targeting model. The online system 140 predicts a first group of users, of the users of the online system 140, using the first targeting model and the characteristic of interest (e.g., photography). Likewise, the online system 140 predicts a second group of users, of the users of the online system 140, using the second targeting model and the characteristic of interest.

The online system 140 determines 315, for each predicted group of users, a set of users of the online system 140 that are made up of one or more users that are not part of the predicted groups of users. For example, the online system 140 may determine a first set of users who are not part of the first predicted set of users, and similarly identify a second set of users who are not part of the second predicted set of users.

The online system 140 provides 320 a survey to the determined sets of users. The surveys include questions designed to validate whether the users should be associated with the characteristic of interest. For example, if the characteristic of interest is having kids, possible survey questions may be, e.g., "are you a parent?," "do you have kids?," etc. The online system 140 provides the surveys to the client devices 110 associated with the identified users.

The online system 140 determines 325, for each predicted group of users, at least one user of the online system 140 that is part of the predicted group of users. For example, the online system 140 may determine a first subgroup of users who are part of the first predicted group of users, and similarly identify a second subset of users who are part of the second predicted group of users. In some embodiments, for a given predicted group of users, the online system 140 randomly selects a threshold number of users from the predicted group of users. For example, the online system 140 may randomly select 10% of each of the first predicted group of users as the first subgroup.

The online system 140 provides 330 an ad preferences tool to users in the first subgroup and the second subgroup. The ad preferences tool prompts a viewing user to confirm one or more of their characteristics, including the characteristic of interest. In addition to the characteristic of interest, the ad preferences tool may, e.g., prompt the viewing user to confirm and/or provide other characteristics about themselves, prompt the viewing user for information relating to types of advertisements they are interested in being presented, or some combination thereof. The online system 140 provides the generated ad preferences tools to the client devices 110 associated with the users of the first and second subgroups.

The online system 140 scores 335 the first targeting model and the second targeting model based on received feedback from the ad preferences tools and the surveys. The received feedback from the surveys may be used to determine a total number of false negatives and a total number of false positives. And the feedback from the ad preferences tools is used to determine a total number of false positives and a total number of true positives (e.g., as described above with regard to FIG. 2). The true positives, false positives, true negatives, and false negatives, are used by the online system 140 to determine one or more scores. The one or more scores may include, e.g., the model score, the precision score, the recall score, some other score associated with the performance of a targeting model. In some embodiments, the online system 140 provides some or all of the determined scores to the user via the model evaluation interface. Additionally, in some embodiments, the online system 140 ranks each of the plurality of targeting models by their respective scores (e.g., model score), and provides the ranking to the user of the online system 140. The score information can be provided for display internally within the online system 140 for use as a universal benchmark in evaluating targeting models. The score information can also be provided to advertisers as feedback about targeting models.

The online system 140 conducts 345 A/B testing on a selected targeting model and an active targeting model. In some embodiments, the online system 140 automatically selects the targeting model (e.g., the first targeting model or the second targeting model) that has the highest model score. To simplify the following discussion, it is assumed that in this case, the first targeting model is selected. In alternate embodiments, the online system 140 receives instructions from the user, the instructions identifying the selected targeting model. Additionally, in some embodiments, instructions may, for example, identify a targeting model to test, identify an active targeting model to test, identify one or more characteristics of interest, modify one or more rules of a targeting model, or some combination thereof.

As part of the A/B testing, the online system 140 predicts a third group of users for the active targeting model, for the characteristics being tested. As discussed above with regard to FIG. 2, the online system 140 predicts the third group of users by applying one or more rules associated with the active targeting model. The online system 140 selects an advertisement based on the characteristic of interest and targeting criteria associated with different advertisements. The online system 140 then provides the selected advertisement to the predicted third group of users and the predicted group of users. The online system 140 then determines metric to evaluate the performance of the selected targeting model and the active targeting model. The metric may be, e.g., an ad score, a validation metric, an engagement metric, some other metric that evaluates the performance of a targeting model, or some combination thereof. In some embodiments, the online system 140 evaluates the performance of the first targeting model and the active targeting model using the determined metric, and selects the targeting model that is performing better as a new active targeting model. In other embodiments, the online system 140 presents the metrics to the user for determination of whether to make the selected targeting model the new active targeting model.

While the method is shown as having both the providing of surveys 320 and the providing of the ad preferences tool 330. It is possible to use only one or the other of these two methods as a framework for universally evaluating targeting models. In this case, the scoring 335 may be based on one or the other of these two methods, and may not include both. In addition, A/B testing may or may not be included in the method, as well.

SUMMARY

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
retrieving a first targeting model and a second targeting model for targeting content to users of an online system, the first targeting model and the second targeting model including a collection of rules that control how characteristics are mapped to users of the online system;
predicting, using a first targeting model, a first group of users of the online system as candidates to be in a targeting cluster associated with a characteristic of interest;
predicting, using the second targeting model, a second group of users of the online system as candidates to be in the targeting cluster;
providing a feedback interface to a set of users comprising users of the first group of users and users of the second group of users, the feedback interface enabling each user of the set of users to modify user preferences for the user, the feedback interface configured to flag users that remove a user preference associated with the characteristic of interest;
scoring the first targeting model and the second targeting model based at least in part on the users flagged by the feedback interface, each score measuring precision and recall of the first target model or second targeting model;
determining that the first targeting model performs better than the second targeting model based in part on the scoring;
identifying a subset of users from the first group of users as a testing group and remaining users from the first group of users as a holdout group;
selecting a first content item to provide the testing group based on a first set of characteristics not including the characteristic of interest;
selecting a second content item different from the first content item to provide to the holdout group based on a second set of characteristics including the characteristic of interest;
presenting the first content item to the testing group and the second content item to the holdout group; and
determining a value associated with the characteristic of interest based on a comparison of a performance of the first content item presented to the testing group and a performance of the second content item presented to the holdout group.

2. The method of claim 1, further comprising:
retrieving an active targeting model, the active targeting model defining how the online system selects targeting attributes for users of the online system;
predicting, using the active targeting model, a third group of users of the online system as candidates to be in the targeting cluster;
selecting a third content item to provide to the first group of users and to the third group of users based in part on targeting criteria associated with the content item matching the characteristic of interest; and
providing the third content item to user devices associated with the third group of users.

3. The method of claim 2, further comprising:
determining a metric to evaluate performance of the first targeting model and the active targeting model based in part on the targeting criteria associated with the selected content item;
scoring the first targeting model and the active targeting model using the determined metric; and
based in part on the scoring, selecting as a new active targeting model a targeting model selected from a group consisting of the first targeting model and the active targeting model.

4. The method of claim 1, further comprising:
providing a model evaluation interface to a client device associated with a user of the online system, the model evaluation interface presenting a plurality of targeting models including the first targeting model and the second targeting model; and
wherein the first targeting model and the second targeting model are retrieved in response to receiving a selection by the user of the first targeting model and the second targeting model.

5. The method of claim 1, further comprising:
determining the value associated with the characteristic of interest based in part on conversions of the first content item by the testing group and conversions of the second content item by the holdout group.

6. The method of claim 1, wherein identifying the holdout group further comprises:
determining a random distribution for one or more characteristics; and
selecting users of the online system based in part on the random distribution.

7. A system comprising:
a non-transitory computer-readable storage medium storing executable computer instructions that, when executed by a processor, cause the processor to perform steps comprising:
retrieving a first targeting model and a second targeting model for targeting content to users of an online system, the first targeting model and the second targeting model including a collection of rules that control how characteristics are mapped to users of the online system;
predicting, using a first targeting model, a first group of users of the online system as candidates to be in a targeting cluster associated with a characteristic of interest;
predicting, using the second targeting model, a second group of users of the online system as candidates to be in the targeting cluster;
providing a feedback interface to a set of users comprising users of the first group of users and users of the second group of users, the feedback interface enabling each user of the set of users to modify user preferences for the user, the feedback interface configured to flag users that remove a user preference associated with the characteristic of interest; and
scoring the first targeting model and the second targeting model based at least in part on the users flagged by the feedback interface, each score measuring precision and recall of the first target model or second targeting model;
determining that the first targeting model performs better than the second targeting model based in part on the scoring;
identifying a subset of users from the first group of users as a testing group and remaining users from the first group of users as a holdout group;
selecting a first content item to provide the testing group based on a first set of characteristics not including the characteristic of interest;
selecting a second content item different from the first content item to provide to the holdout group based on a second set of characteristics including the characteristic of interest;
presenting the first content item to the testing group and the second content item to the holdout group; and
determining a value associated with the characteristic of interest based on a comparison of a performance of the first content item presented to the testing group and a performance of the second content item presented to the holdout group; and
a processor to execute the instructions.

8. The system of claim 7, wherein the instructions, when executed, cause the processor to perform further steps comprising:
retrieving an active targeting model, the active targeting model defining how the online system selects targeting attributes for users of the online system;
predicting, using the active targeting model, a third group of users of the online system as candidates to be in the targeting cluster;
selecting a third content item to provide to the first group of users and to the third group of users based in part on targeting criteria associated with the content item matching the characteristic of interest; and
providing the third content item to user devices associated with the third group of users.

9. The system of claim 8, wherein the instructions, when executed, cause the processor to perform further steps comprising:
determining a metric to evaluate performance of the first targeting model and the active targeting model based in part on the targeting criteria associated with the selected content item;
scoring the first targeting model and the active targeting model using the determined metric; and
based in part on the scoring, selecting as a new active targeting model a targeting model selected from a group consisting of the first targeting model and the active targeting model.

10. The system of claim 7, wherein the instructions, when executed, cause the processor to perform further steps comprising:
providing a model evaluation interface to a client device associated with a user of the online system, the model evaluation interface presenting a plurality of targeting models including the first targeting model and the second targeting model; and
wherein the first targeting model and the second targeting model are retrieved in response to receiving a selection by the user of the first targeting model and the second targeting model.

11. The system of claim 7, wherein the instructions, when executed, cause the processor to perform further steps comprising:
determining the value associated with the characteristic of interest based in part on conversions of the first content item by the testing group and conversions of the second content item by the holdout group.

12. The system of claim 7, wherein identifying the holdout group further comprises:
- determining a random distribution for one or more characteristics; and
- selecting users of the online system based in part on the random distribution.

13. A non-transitory computer-readable storage medium storing executable computer instructions that, when executed by a processor, cause the processor to perform steps comprising:
- retrieving a first targeting model and a second targeting model for targeting content to users of an online system, the first targeting model and the second targeting model including a collection of rules that control how characteristics are mapped to users of the online system;
- predicting, using a first targeting model, a first group of users of the online system as candidates to be in a targeting cluster associated with a characteristic of interest;
- predicting, using the second targeting model, a second group of users of the online system as candidates to be in the targeting cluster;
- providing a feedback interface to a set of users comprising users of the first group of users and users of the second group of users, the feedback interface enabling each user of the set of users to modify user preferences for the user, the feedback interface configured to flag users that remove a user preference associated with the characteristic of interest;
- scoring the first targeting model and the second targeting model based at least in part on the users flagged by the feedback interface, each score measuring precision and recall of the first target model or second targeting model;
- determining that the first targeting model performs better than the second targeting model based in part on the scoring;
- identifying a subset of users from the first group of users as a testing group and remaining users from the first group of users as a holdout group;
- selecting a first content item to provide the testing group based on a first set of characteristics not including the characteristic of interest;
- selecting a second content item different from the first content item to provide to the holdout group based on a second set of characteristics including the characteristic of interest;
- presenting the first content item to the testing group and the second content item to the holdout group; and
- determining a value associated with the characteristic of interest based on a comparison of a performance of the first content item presented to the testing group and a performance of the second content item presented to the holdout group.

14. The non-transitory computer-readable storage medium of claim 13, wherein the instructions, when executed, cause the processor to perform further steps comprising:
- retrieving an active targeting model, the active targeting model defining how the online system selects targeting attributes for users of the online system;
- predicting, using the active targeting model, a third group of users of the online system as candidates to be in the targeting cluster;
- selecting a third content item to provide to the first group of users and to the third group of users based in part on targeting criteria associated with the content item matching the characteristic of interest; and
- providing the third content item to user devices associated with the third group of users.

15. The non-transitory computer-readable storage medium of claim 14, wherein the instructions, when executed, cause the processor to perform further steps comprising:
- determining a metric to evaluate performance of the first targeting model and the active targeting model based in part on the targeting criteria associated with the selected content item;
- scoring the first targeting model and the active targeting model using the determined metric; and
- based in part on the scoring, selecting as a new active targeting model a targeting model selected from a group consisting of the first targeting model and the active targeting model.

16. The non-transitory computer-readable storage medium of claim 13, wherein the instructions, when executed, cause the processor to perform further steps comprising:
- providing a model evaluation interface to a client device associated with a user of the online system, the model evaluation interface presenting a plurality of targeting models including the first targeting model and the second targeting model; and
- wherein the first targeting model and the second targeting model are retrieved in response to receiving a selection by the user of the first targeting model and the second targeting model.

17. The non-transitory computer-readable storage medium of claim 13, wherein the instructions, when executed, cause the processor to perform further steps comprising:
- determining the value associated with the characteristic of interest based in part on conversions of the first content item by the testing group and conversions of the second content item by the holdout group.

* * * * *